United States Patent
Huang et al.

(10) Patent No.: US 9,807,252 B2
(45) Date of Patent: Oct. 31, 2017

(54) TOP UP COMMUNICATION SYSTEM AND METHOD THEREOF

(71) Applicants: Nen-Fu Huang, Hsinchu (TW); Wei-Kuan Shih, Hsinchu (TW)

(72) Inventors: Nen-Fu Huang, Hsinchu (TW); Wei-Kuan Shih, Hsinchu (TW)

( * ) Notice: Subject to any disclaimer, the term of this patent is extended or adjusted under 35 U.S.C. 154(b) by 4 days.

(21) Appl. No.: 15/012,219

(22) Filed: Feb. 1, 2016

(65) Prior Publication Data

US 2016/0277593 A1   Sep. 22, 2016

(30) Foreign Application Priority Data

Mar. 20, 2015 (TW) .............................. 104108972 A (51) Int. Cl.
| | |
|---|---|
| *H04M 17/00* | (2006.01) |
| *H04M 17/02* | (2006.01) |
| *H04W 4/24* | (2009.01) |
| *H04M 1/2755* | (2006.01) |

(52) U.S. Cl.
CPC ......... *H04M 17/304* (2013.01); *H04M 17/02* (2013.01); *H04M 17/026* (2013.01); *H04W 4/24* (2013.01); *H04M 1/2755* (2013.01); *H04M 2017/248* (2013.01)

(58) Field of Classification Search
None
See application file for complete search history.

(56) References Cited

U.S. PATENT DOCUMENTS

| | | | |
|---|---|---|---|
| 2005/0085217 A1* | 4/2005 | Lim ..................... | H04M 1/66 455/410 |
| 2010/0299221 A1* | 11/2010 | Paschini .............. | G06Q 10/087 705/26.1 |

* cited by examiner

*Primary Examiner* — Moustapha Diaby
(74) *Attorney, Agent, or Firm* — Muncy, Geissler, Olds & Lowe, P.C.

(57) ABSTRACT

A top up communication system and method thereof are provided, which provides a call between at least two electronic devices, where each of the at least two electronic devices has a unique identification code. The method includes following steps: buying a deposit code on the web-site or obtaining it sent from others; surfing a user interface of an activating data server; inputting the deposit code into the user interface to generate an activate identification data; scanning the activate identification data by a scanner to generate a shortcut icon on a monitor of the scanner; transmitting a dialed command to a connection generation server by triggering the shortcut icon; using the dialed command to establish a communication link between the at least two electronic devices by the connection generation server.

10 Claims, 5 Drawing Sheets

TOP UP COMMUNICATION SYSTEM AND METHOD THEREOF

CROSS-REFERENCE TO RELATED APPLICATION

This application claims the benefit of Taiwan Patent Application No. 104108972, filed on Mar. 20, 2015, in the Taiwan Intellectual Property Office, the disclosure of which is incorporated herein in its entirety by reference.

BACKGROUND OF THE INVENTION

1. Field of the Invention

The present disclosure generally relates to a top up communication system, in particular to a top up communication system and a method thereof which are feasible to be shared by multiple users.

2. Description of the Related Art

If one wants to use a portable calling card/top up card, the user has to buy a physical telephone card in a store to derive an authorization code or a deposit code. When using the authorization code or the deposit code, the user inquires the telecommunication host whether the authorization code or the deposit code is registered in the telecommunication host, and when the registration is approved, the user is able to make a phone call based on the amount of the deposit. As to another manner, the user applies for being a member of an internet platform, and then logs in to the internet platform to make a top up by purchasing points or paying on-line through credit card, such that the communication is available based on the amount of the deposit.

However, such manners have the shortcomings. For example, the amount of the deposit of the calling card/top up card can be only used by one user and fails to be shared by multiple users. Moreover, the aforementioned manners cannot be utilized by companies as the lack of effective communication management. For example, the dialer can only make a business communication by the calling card/top up card. As a result, the foregoing manners are not economically and the current top up communication system and method thereof are only feasible to be used for common personal consumers.

As a result, a top up communication system and a method thereof are necessary for resolving the aforementioned problems.

SUMMARY OF THE INVENTION

In view of the aforementioned problem, the present disclosure provides a top up communication system and a method thereof which are feasible to be shared by multiple users.

In view of the aforementioned problem, the present disclosure provides a top up communication system and a method thereof which are able to manage the communication effectively.

According to the foregoing objective, the present disclosure provides a top up communication method which is feasible to establish a call between at least two electronic devices, where each of the at least two electronic devices has a unique identification code, and the method includes the following steps: surfing a user interface of an activating data server; inputting a deposit code into the user interface to generate an activate identification data; scanning the activate identification data by a scanner to generate a shortcut icon on a monitor of the scanner; transmitting a dialed command to a connection generation server by triggering the shortcut icon displayed on the monitor, wherein the dialed command includes the unique identification code of each of the at least two electronic devices and the deposit code input through the user interface or the monitor, and using the dialed command to establish a communication link between the at least two electronic devices by the connection generation server.

Preferably, the activate identification data includes a QR code, a text or a barcode.

Preferably, the unique identification code includes a telephone number, an E-mail address, a personal account or a combination thereof, and when the unique identification code is the telephone number, the user interface displays a country code of the telephone number and accordingly adds the country code to the telephone number.

Preferably, the top up communication method further includes storing an account corresponding to the unique identification code in the connection generation server, and when the communication is a VoIP, the connection generation server establishes the communication link corresponding to the account according to the unique identification code.

Preferably, the top up communication method further includes deriving the deposit code from a top up server.

According to the aforementioned object, the present disclosure further provides a top up communication system which is feasible to establish a call between at least two electronic devices, where each of the at least two electronic devices has a unique identification code, and the system includes a top up server, an activating data server, a scanner and a connection generation server. The top up server provides a deposit code. The activating data server includes a user interface and a processing unit, the user interface derives the deposit code, the processing unit generates an activate identification data according to the deposit code and displays the activate identification data on the user interface. The scanner includes an optical sensor and a monitor, the optical sensor scans the activate identification data to generate a shortcut icon on the monitor, wherein the dialed command includes the unique identification code of each of the at least two electronic devices and the deposit code input through the user interface or the monitor. The connection generation server receives the dialed command and establishes a communication link between the at least two electronic devices by the dialed command.

Preferably, the activate identification data includes a QR code, a text or a barcode.

Preferably, the unique identification code includes a telephone number, an E-mail address, a personal account or a combination thereof, and when the unique identification code is the telephone number, the user interface displays a country code of the telephone number and accordingly adds the country code to the telephone number.

Preferably, the connection generation server stores an account corresponding to the unique identification code, and when the communication is a Voice Over IP (VoIP), the connection generation server establishes the communication link corresponding to the account according to the unique identification code.

Preferably, the activate identification data includes a call setup and the communication link is established according to the call setup, and the call setup includes a manner of the communication, a permissible time of establishing the communication link or a permissible duration of establishing the communication link.

BRIEF DESCRIPTION OF THE DRAWINGS

The detailed structure, operating principle and effects of the present disclosure will now be described in more details hereinafter with reference to the accompanying drawings that show various embodiments of the disclosure as follows.

DETAILED DESCRIPTION OF THE PREFERRED EMBODIMENTS

Hereinafter, embodiments of the present disclosure will be described in detail with reference to the accompanying drawings so that those skilled in the art to which the present disclosure pertains can realize the present disclosure. As those skilled in the art would realize, the described embodiments may be modified in various different ways, all without departing from the spirit or scope of the present disclosure.

The exemplary embodiments of the present disclosure will be understood more fully from the detailed description given below and from the accompanying drawings of various embodiments of the disclosure, which, however, should not be taken to limit the disclosure to the specific embodiments, but are for explanation and understanding only.

Figure 1:
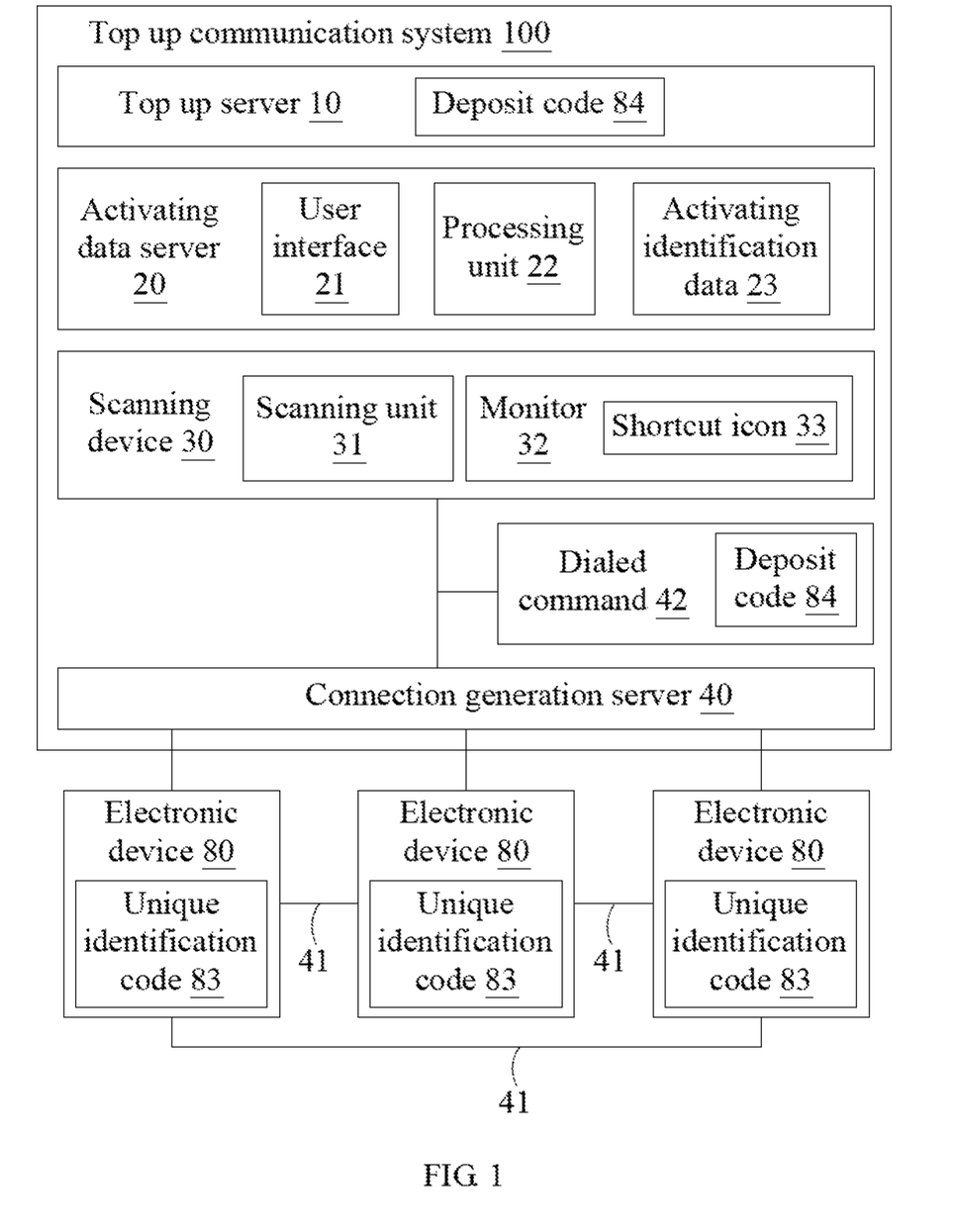
FIG. 1 is a block diagram of the first embodiment of the top up system in accordance with the present disclosure.

Please refer to FIG. 1 which is a block diagram of the first embodiment of the top up system in accordance with the present disclosure. A top up communication system 100 is feasible to establish a communication link between at least two electronic devices 80, and the at least two electronic device 80 includes a unique identification code 83. The top up communication system 100 includes a top up server 10, an activating data server 20, a scanner 30 and a connection generation server 40. The unique identification code 83 may be a telephone number, an E-mail address or an internet account, and the electronic device 80 may be a smartphone or a home phone. The top up server 10 and the activating data server 20 may be a computer host or a workstation. The scanner 30 may be a smartphone or a tablet with a built-in lens.

The top up server 10 is applied to provide a pay certification or a deposit code 84 when the user tops up with an amount of money. The activating data server 20 includes a user interface 21 and a processing unit 22. The processing unit 22 may be a CPU or a MCU. The unique identification code 83 and the deposit code 84 of each of the at least two electronic devices 80 are input into the user interface 21 by a web interface. Alternatively, the unique identification code 83 of one of the at least two electronic devices 80 is input, and the unique identification codes 83 of the other electronic devices are input when triggering a shortcut icon 33. The processing unit 22 generates an activate identification data 23 according to the unique identification code 83 of each of at least two electronic devices 80 or only one unique identification code 83 and displays the activate identification data 23 on the user interface 21. The activate identification data 23 may be a QR code, a text or a barcode which is coded.

The scanner 30 includes an optical sensor 31 and a monitor 32. The optical sensor 31 may be a lens and is applied to scan the activate identification data 23. An application program of image recognition is used to decode the QR code or barcode to generate the shortcut icon 33 on the monitor 32. Alternatively, when the activate identification data 23 is the text (such as the web address), user may directly click the URL link to generate the shortcut icon 33 on the monitor 32. When the shortcut icon 33 displayed on the monitor 32 is triggered, the scanner 30 generates a dialed command 42. The dialed command 42 includes the unique identification code 83 of each of the electronic devices 80 and the deposit code 84 input through the user interface 21 or the monitor 32. The connection generation server 40 is provided to receive the dialed command 42 and to establish a communication link 41 between the at least two electronic devices 80 according to the dialed command 42. The deposit code 84 indicates a top up identification or an identification account of the user. When the communication link 41 is completed, the connection generation server 40 transmits the deposit code 84 and the call duration of the communication link 41 to the top up server 10 and then automatically debits the user's deposit. Identifying the top up identification code and the identification account in the top up server 10 is well-known towards those skilled in the field of the electronic calculator, and the unnecessary details are no longer given herein.

Figure 2:
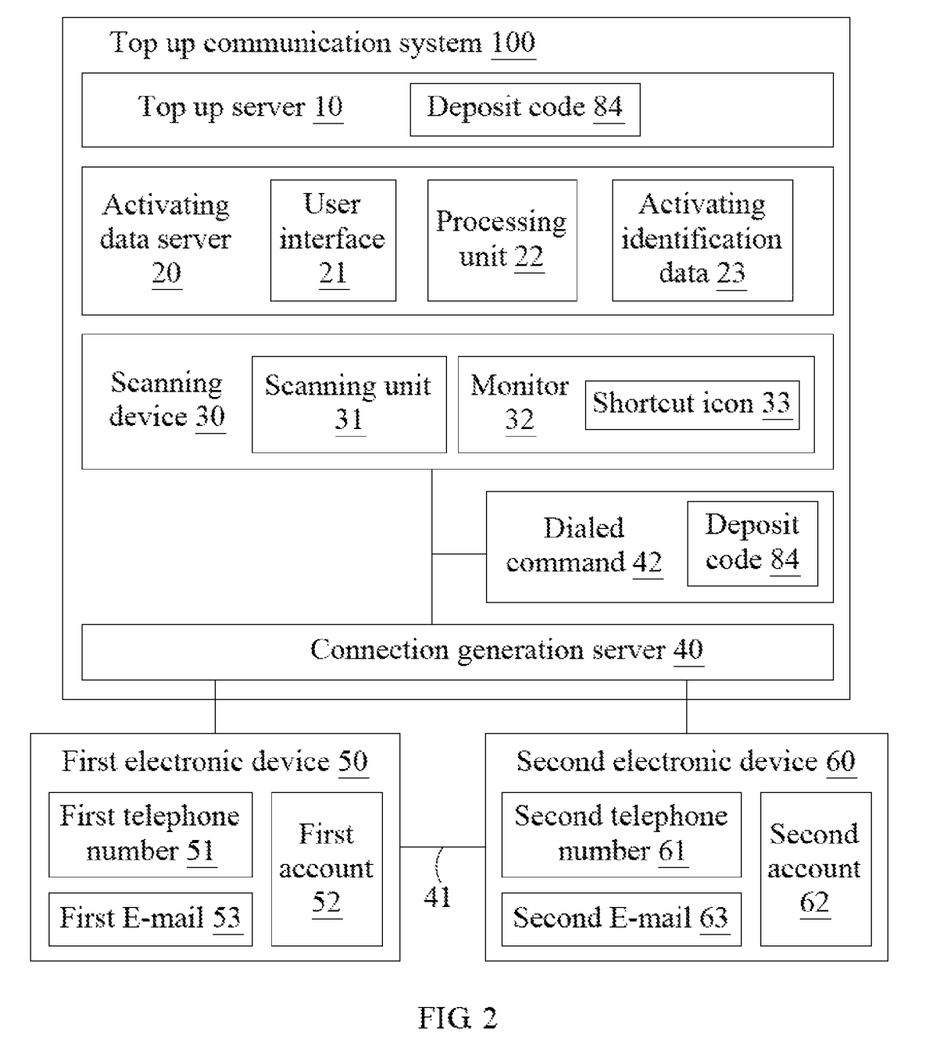
FIG. 2 is a block diagram of the second embodiment of the top up system in accordance with the present disclosure.

Please refer to FIG. 2 which is a block diagram of the second embodiment of the top up system in accordance with the present disclosure. Please refer to FIG. 1 and FIG. 2 together. A first electronic device 50 and a second electronic device 60 are applied to explain more details herein. Besides, a first telephone number 51 and a second telephone number 61 are used to indicate the unique identification codes of the first electronic device 50 and the second electronic device 60. Here, the first electronic device 50 and the second electronic device 60 may be a home telephone and a smartphone, respectively.

Compared with the first embodiment, the difference of the second embodiment lies in that the user is able to input a first telephone number 51, a second telephone number 61 and a deposit code 84 into the user interface 21, and the processing unit 22 generates the activate identification data 23 according to the first telephone number 51, the second telephone number 61 and the deposit code 84 and then display the activate identification data 23 on the user interface 21. Here, the processing unit 22 may be a software application program which is able to respond appropriately based on the user's input. The activate identification data 23 includes an unchangeable QR code, barcode, or a text or a web address which can be changed by the user.

Please refer to FIG. 2 again. Another embodiment of the present disclosure shows that only the first telephone number 51 and the deposit code 84 are input, and the processing unit 22 also generates the activate identification data 23 according to the first telephone number 51 and the deposit code 84 and displays the activate identification data 23 on the user interface 21. The second telephone number 61 is input when the connection is actually established. Alternatively, the first telephone number 51 and the second telephone number 61 are not input into the user interface in advance, and the deposit code 84 derived from the top up server 10 is not limited to be applied to the first electronic device 50 and the second electronic device 60. The processing unit 22 generates the activate identification data 23 based on only one deposit code 84 and displays the activate identification data 23 on the user interface 21. When a communication is desired, the first telephone number 51 and the second telephone number 61 are input into the user interface.

The scanner 30 may be a smartphone, a tablet or a mobile device disposed with lens. When the user triggers the shortcut icon 33 on the scanner 30, the scanner 30 transmits the dialed command 42 to the communication generation server 40. Here, the dialed command 42 includes the first telephone number 51, the second telephone number 61 and a deposit code 84. So, the communication generation server 40 automatically establishes a communication link 41 between the first electronic device 50 and the second electronic device 60 according to the first telephone number 51 and the second telephone number 61. In other words, the communication generation server 40 dials the first electronic device 50 and the second electronic device 60. According to such manner, the first electronic device 50 and the second electronic device 60 both receive a call from the communication generation server 40 when the communication link 41 is established between the first electronic device 50 and the second electronic device 60, and when the calls are answered, the first electronic device 50 and the second electronic device 60 is able to make a communication.

Similarly, if the first telephone number 51 and the second telephone number 61 are not input into the user interface in advance, or only the first telephone number 51 is input and the second telephone number 61 is not input, when triggering the shortcut icon 33, the monitor 32 of the scanner 30 is applied to connect with a desired electronic device, such that the dialed command 42, which is transmitted to the connection generation server 40, includes the first telephone number 51, the second telephone number 61 and the deposit code 84 so as to establish the communication link 41 between the first electronic device 50 and the second electronic device 60.

It is worth mentioning that the scanner 30 may be one of the first electronic device 50 and the second electronic device 60, but is shall be not limited thereto. Another electronic device may be also applied as an example, such that the top up communication system 100 is able to be operated more flexibly.

Furthermore, country codes of the first telephone number 51 and the second telephone number 61 are displayed on the user interface 21, so that the country codes are respectively added to the first telephone number 51 and the second telephone number 61. When the first telephone number 51 and the second telephone number 61 have different country codes or the country codes originate from unknown or unfamiliar places towards to the user, country codes of the telephone numbers are automatically added and included in the activate identification data 23. Such character facilitates the user to input the first telephone number 51 and the second telephone number 61 into the user interface 21 without remembering the country codes thereof so as to promote the convenience.

In addition, when the activate identification data 23 is generated in the user interface 21, a call setup is further added to the activating data server 20, so that the communication link is established based on the call setup when the communication link 41 is established. The call setup includes a manner of the communication link 41, a permissible time of establishing the communication link 41 or a permissible duration of establishing the communication link 41. The manner of the communication link 41 includes a VoIP, tradition phone call or a combination thereof. The permissible time or the permissible duration of establishing the communication link 41 limits the call duration between the first electronic device 50 and the second electronic device 60 according to the user's actual requirements. For example, communication is only made in duty hour, duration of customer's call is limited or call from the specific account is blocked. Although the call setup is added when the activate identification data 23 is generated, but it shall be not limited thereto. The call setup can be modified anytime.

To be precise, the communication link 41 is made flexibly by the connection generation server 40. The connection generation server 40 stores an account corresponding to the first telephone number 51 and the second telephone number 61, and the stored account is provided for internet search and communication. When the connection generation server 40 establishes the communication link 41 of a VoIP according to the call setup, the connection generation server 40 finds out the first electronic device 50 and the second electronic device 60 according to the corresponding account. The first electronic device 50 and the second electronic device 60 respectively include a surrogate answer application program which is applied to decide whether answers the communication link 41.

It is worth to mention that such manner is decided according to state of the network connection of the first electronic device 50 and the second electronic device 60. When the network connection is excellent, the surrogate answer application program answers the communication link 41 from the connection generation server 40, and when the network connection is disconnected, the surrogate answer application program is idle and then the connection generation server 40 establishes the communication link 41 of telecommunication between the first electronic device 50 and the second electronic device 60.

More precisely, the surrogate answer application program is designed according to the communication link 41 of a VoIP built in the system. The surrogate answer application program may be an internet application program disposed in the smartphone or tablet, and it is only provided to receive phone call and transmit voice without having the dial function. Compared with the other internet real-time call software, the surrogate answer application program needs smaller memory space and has faster processing speed, which promotes the communication quality of answering the call.

On the other hand, if the private communication is concerned, the unique identification codes of the first electronic device 50 and the second electronic device 60 may be replaced by a first E-mail 53 and a second E-mail 63. Before the communication is made, the user has to register the first telephone number 51 corresponding to the first E-mail 53 and a first account 52, and the second telephone number 61 corresponding to the second E-mail 63 and a second account 62 on the connection generation server 40. Consequently, when the connection generation server 40 receives the dialed command 42 including the first E-mail 53 and the second E-mail 63, the communication link 41 between the first electronic device 50 and the second electronic device 60 is established correspondingly to the first telephone number 51 (or the first account 52) and the second telephone number 61 (the second account 62). So, the user needn't to input the first telephone number 51 and the second telephone number 61 on the user interface 21 to avoid the privacy leakage.

It is noteworthy that the first electronic device 50 and the second electronic device 60 are used as the exemplary embodiment, but the number of the electronic devices 80 can be extended to more than two to achieve the communication link 41 between at least two users. In other words, the top up communication system of the present disclosure is also able to achieve the function of the conference call, and the embodiment is similar to the communication link 41 established between two electronic devices, and thus, the unnecessary details are not given herein.

Figure 3:
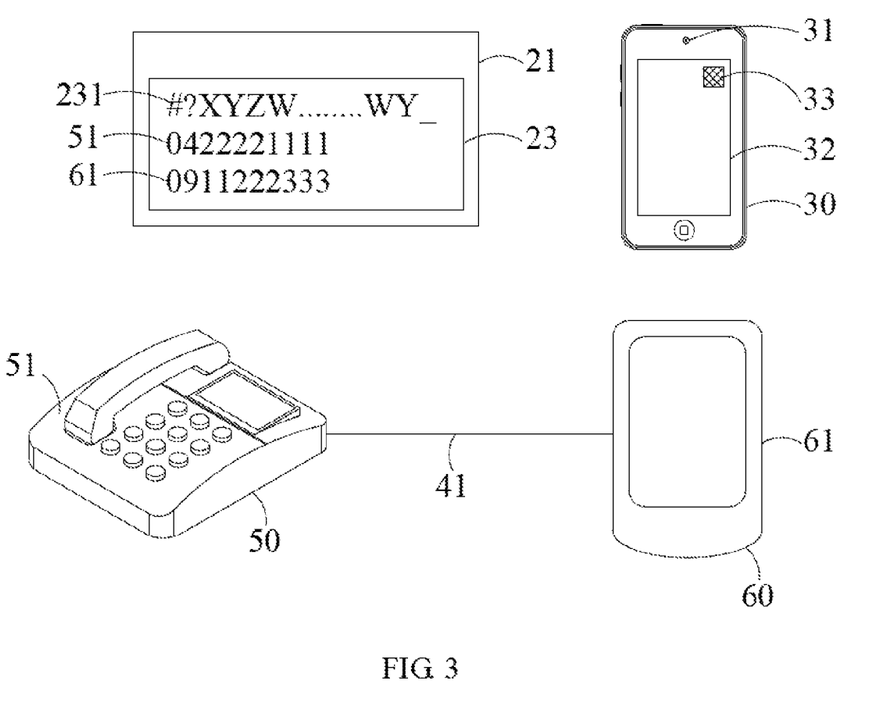
FIG. 3 is a block diagram of the third embodiment of the top up system in accordance with the present disclosure.

Please refer to FIG. 3 which is a block diagram of the third embodiment of the top up system in accordance with the present disclosure. In the embodiment, the scanner 30 and the second electronic device 60 are applied as an example, and the scanner 30 includes a lens which is used to scan text or image. A home telephone is used as an example to demonstrate first electronic device 50. Please refer to FIG. 2 and FIG. 3 together for more details.

As shown in FIG. 3, when the user derives the deposit code 84 (or pay identification) and surfs the activating data server 20 through the top up, such as on-line payment or points purchase, the activate identification data 23 of the user interface 21 includes an activate identification code 231, a first telephone number 51, a second telephone number 61 and the deposit code 84. The activate identification code 231 may be an identifying text or symbol generated by using the random number, and the scanner is provided to scan the activate identification data 23 to produce a shortcut icon 33 on the monitor 32. When the shortcut icon 33 is triggered, the connection generation server 40 automatically dials the first electronic device 50 and the second electronic device 60. Such manner of connection has been mentioned in the forgoing block diagrams and the unnecessary details are no longer given herein. What has to be noted herein is that the activate identification data 23 is able to be transmitted to the specific person by means of different manners such as E-mail, message or real-time chat software and so on for the sake of the flexibility of the system. In addition, the specific person may hereby generate the shortcut icon 33 through the electronic device so as to establish the communication link 41 between the first electronic device 50 and the second electronic device 60.

Here, a boss holding the first electronic device 50 and a customer holding the second electronic device 60 are applied as an example for describing the following embodiment. When the boss derives the deposit code through the top up, the activate identification data 23 is generated for connecting the first electronic device 50 and the second electronic device 60 by means of the aforementioned connection. The boss sends the activate identification data 23 to a secretary through an E-mail, and then the secretary triggers the shortcut icon 33 produced on the mobile device to establish a communication link between the boss and the customer. Alternatively, the boss only inputs the first telephone number 51 of the first electronic device 50 to generate the activate identification data 23 and also sends the activate identification data 23 to the secretary. So, whenever the boss has to communicate with the customer, the boss informs the secretary to inquire the second electronic device 60 which represents different customers, and then the secretary triggers the shortcut icon 33 while inputting the second telephone number 61 to establish the communication link 41 so as to increase the usage flexibility. Besides, a company is able to utilize such system to effectively manage the communications of the employees. For example, when the company derives the deposit code through the top up, the activate identification data 23 is hereby produced. The second telephone number 61 of the activate identification data 23 is set as the company's telephone number, the first telephone number 51 is set as the employee's telephone number, and the employee's telephone number may be the scanner and the first electronic device 50. As a result, the employee enables to dials the company according to the top up of the money.

Figure 4:
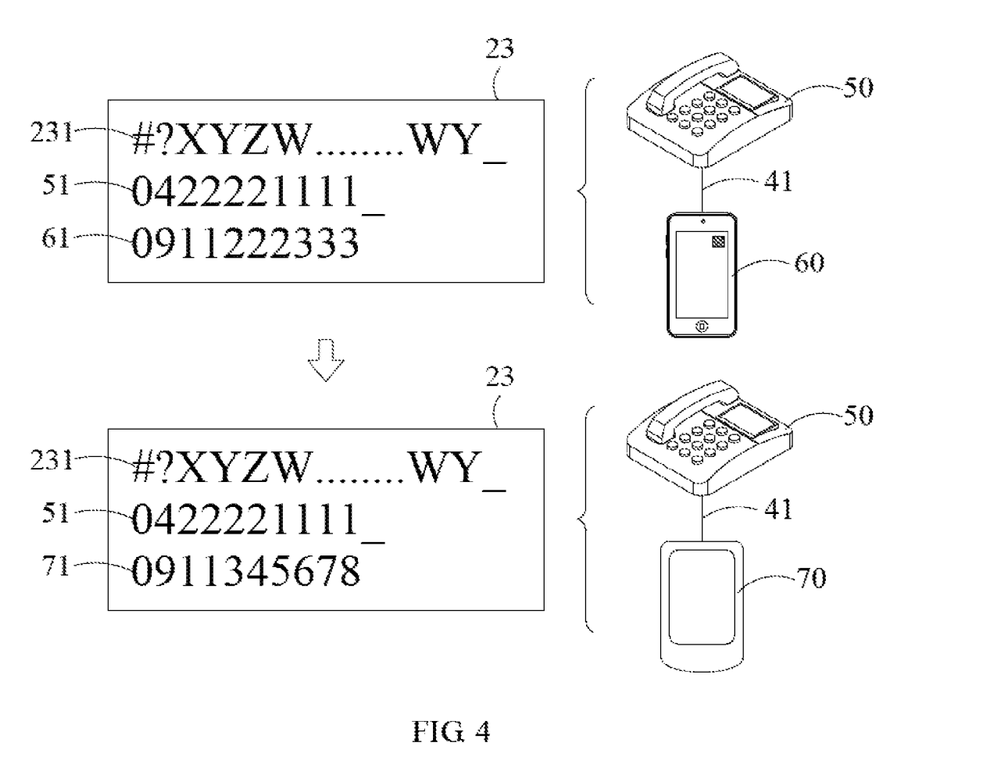
FIG. 4 is a block diagram of the fourth embodiment of the top up system in accordance with the present disclosure.

Please refer to FIG. 4 which is a block diagram of the fourth embodiment of the top up system in accordance with the present disclosure. The activate identification data 23 applies the text as an example in the present embodiment. The activate identification data 23 of the present disclosure may be multiple users. For example, when a mother tops up by 50 US dollars and the activate identification data 23 is hereby produced, the activate identification data 23 is able to be served as a gift to two children. The two children, who respectively hold the second electronic device 60 and a third electronic device 70, manually replaces the second telephone number 61 with a third telephone number 71 to generates two sets of the different activate identification data 23. The first set of the activate identification data 23 is provided the first electronic device 50 and the second electronic device 60 for connecting and the second set of the activate identification data 23 is provided the first electronic device 50 and the third electronic device 70 for connecting. The first telephone number 50 of the first electronic device 50 may be set as a home number.

Please refer to FIG. 4 again. The activate identification data 23 applied in another embodiment of the present disclosure also generates the activate identification code 231 through the top up, and the second electronic device 60 and the third electronic device 70 of the two children both derive the activate identification code 231. When the shortcut icon of the second electronic device 60 is triggered, the application program automatically inputs the second telephone number 61 of the second electronic device 60 to the dialed command, and the two children are able to confirm the communication object through the address book or manually input the first telephone number 51 or the third telephone number 71 and then to establish the communication link 41 therebetween. By means of such manner, two or more than two different electronic devices are able to share the same top up through the system.

It is worth to mention that the telephone number of the activate identification data 23 applied in the present disclosure is not limited to specific order, and the generation of the communication link 41 through the second electronic device 60 and the third electronic device 70 to the first electronic device 50 has been mentioned in the foregoing block diagrams and the unnecessary details are no longer given herein.

Figure 5:
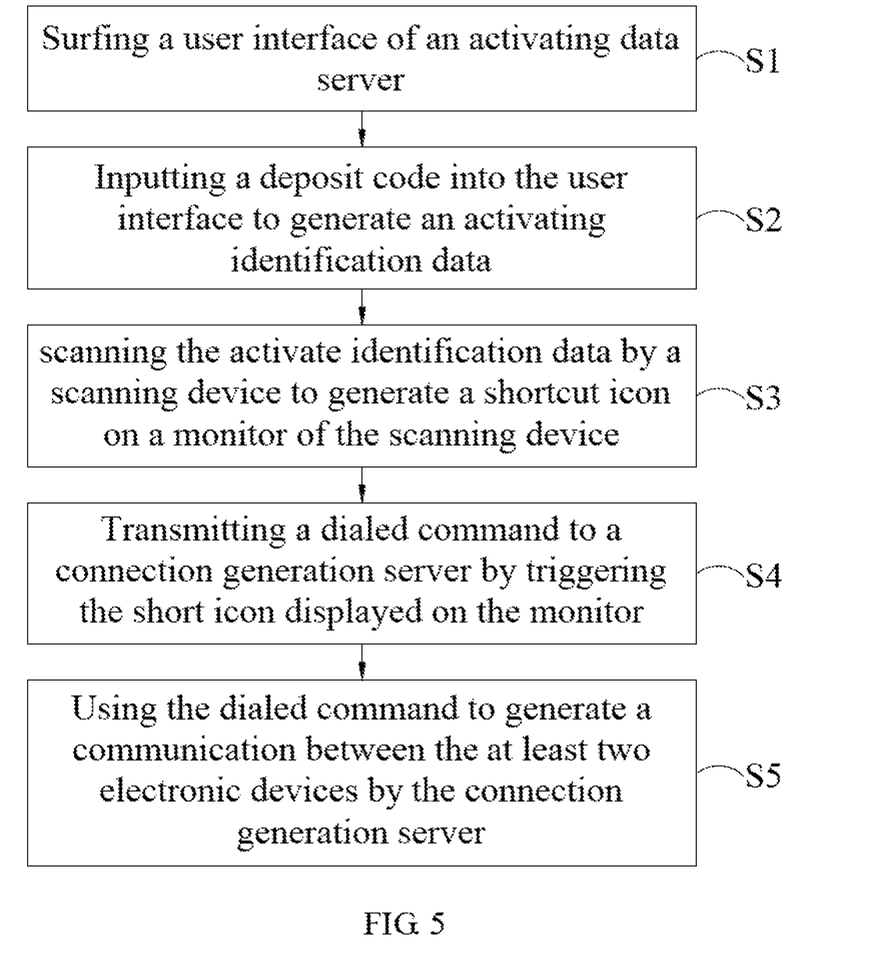
FIG. 5 is a flow chart of the top up method in accordance with the present disclosure.

Please refer to FIG. 5 which is a flow chart of the top up method in accordance with the present disclosure. Besides, please refer to FIG. 1 again. The top up communication method is applied to establish a communication link between at least two electronic devices 80. The at least two electronic devices 80 respectively include a unique identification code 83, and the top up communication method includes the following steps:

Step S1: Surfing a user interface 21 of an activating data server 21;

Step S2: Inputting a deposit code 84 into the user interface 21 to generate an activating identification data 23, wherein the activate identification data 23 may include a QR code, a text or a barcode;

Step S3: Scanning the activate identification data 23 by a scanner 30 to generate a shortcut icon 33 on a monitor 32 of the scanner 30;

Step S4: Transmitting a dialed command 42 to a connection generation server 40 by triggering the shortcut icon 33 displayed on the monitor 32, wherein the dialed command 42 includes the unique identification code 83 of each of the at least two electronic devices 80 and the deposit code 84 input through the user interface 21 or the monitor 32;

Step S5: Using the dialed command 42 to establish a communication link 41 between the at least two electronic devices 80 by the connection generation server 40.

Deriving the deposit code 84 (or pay certification) from a top up server 10 is further included before the Step S1.

The unique identification code 83 includes a telephone number, an E-mail, a person account or a combination thereof. When the unique identification code 83 is a telephone number, the user interface 21 displays a country code of the telephone number and automatically adds the country code to the telephone number. Besides, the unique identification code 83 and the deposit code 84 are able to be input into the user interface 21 to generate the activate identification data 23, or only the unique identification code 83 of one electronic device is input, and when the shortcut icon is triggered, the unique identification code 83 of the other electronic device is input. Alternatively, the unique identification code 83 is not input into the user interface and the activate identification data 23 is transmitted to the user, and after the two electronic devices are determined by the user, the corresponding unique identification codes 83 of the two electronic devices are input.

The top up communication method of the present disclosure further includes storing an account corresponding to the unique identification code 83 in the connection generation server 40, and when the communication link 41 is a VoIP, the connection generation server 40 establishes the communication link 41 corresponding to the account according to the unique identification code 83. For example, when the unique identification code 83 is an E-mail address, the corresponding account may be an internet account which is applied to search and communicate on the internet. Such manner of connection has been described in the first embodiment and the unnecessary details are no longer given herein.

While the means of specific embodiments in present disclosure have been described by reference drawings, numerous modifications and variations could be made thereto by those skilled in the art without departing from the scope and spirit of the disclosure set forth in the claims. The modifications and variations should in a range limited by the specification of the present disclosure.

What is claimed is:

1. A top up communication method being feasible to generate a call between at least two electronic devices, where each of the at least two electronic devices has a unique identification code, and the method comprising steps:
surfing a user interface of an activating data server;
inputting a deposit code into the user interface to generate an activate identification data;
scanning the activate identification data by a scanner to generate a shortcut icon on a monitor of the scanner;
transmitting a dialed command to a connection generation server by triggering the shortcut icon displayed on the monitor, wherein the dialed command comprises the unique identification code of each of the at least two electronic devices and the deposit code input through the user interface or the monitor, and
using the dialed command to establish a communication link between the at least two electronic devices by the connection generation server.

2. The top up communication method of claim 1, wherein the activate identification data comprises a QR code, a text or a barcode.

3. The top up communication method of claim 1, wherein the unique identification code comprises a telephone number, an E-mail address, a personal account or a combination thereof, and when the unique identification code is the telephone number, the user interface displays a country code of the telephone number and accordingly adds the country code to the telephone number.

4. The top up communication method of claim 1, further comprising storing an account corresponding to the unique identification code in the connection generation server, and when the communication is a Voice Over IP (VoIP), the connection generation server establishes the communication link corresponding to the account according to the unique identification code.

5. The top up communication method of claim 1, further comprising deriving the deposit code from a top up server.

6. A top up communication system being feasible to establish a call between at least two electronic devices, where each of the at least two electronic devices has a unique identification code, and the system comprising:
a top up server providing a deposit code;
an activating data server comprising a user interface and a processing unit, the user interface deriving the deposit code, the processing unit generating an activate identification data according to the deposit code and displaying the activate identification data on the user interface;
a scanner comprising an optical sensor and a monitor, the optical sensor scanning the activate identification data to generate a shortcut icon on the monitor, wherein the dialed command comprises the unique identification code of each of the at least two electronic devices and the deposit code input through the user interface or the monitor, and
a connection generation server receiving the dialed command and establishing a communication link between the at least two electronic devices by the dialed command.

7. The top up communication system of claim 6, wherein the activate identification data comprises a QR code, a text or a barcode.

8. The top up communication system of claim 6, wherein the unique identification code comprises a telephone number, an E-mail address, a personal account or a combination thereof, and when the unique identification code is the telephone number, the user interface displays a country code of the telephone number and accordingly adds the country code to the telephone number.

9. The top up communication system of claim 6, wherein the connection generation server stores an account corresponding to the unique identification code, and when the communication is a Voice Over IP (VoIP), the connection generation server establishes the communication link corresponding to the account according to the unique identification code.

10. The top up communication system of claim 6, wherein the activate identification data comprises a call setup and the communication is established according to the call setup, and the call setup comprises a manner of the communication, a permissible time of establishing the communication or a permissible duration of establishing the communication.

* * * * *